United States Patent
Cox et al.

(10) Patent No.: US 9,537,899 B2
(45) Date of Patent: Jan. 3, 2017

(54) DYNAMIC SELECTION OF SECURITY PROTOCOL

(75) Inventors: Matthew R. Cox, Kirkland, WA (US); Ivan D. Pashov, Woodinville, WA (US); Billy Anders, Bothell, WA (US); Jonathan A. Silvera, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 891 days.

(21) Appl. No.: 13/408,225

(22) Filed: Feb. 29, 2012

(65) Prior Publication Data

US 2013/0227272 A1 Aug. 29, 2013

(51) Int. Cl.
H04L 29/06 (2006.01)

(52) U.S. Cl.
CPC .......... *H04L 63/205* (2013.01); *H04L 63/166* (2013.01)

(58) Field of Classification Search
CPC ........ H04L 29/06; H04L 63/00; H04L 63/205; G06F 11/2012
USPC ....................................................... 713/151
See application file for complete search history.

(56) References Cited

U.S. PATENT DOCUMENTS

| | | | | |
|---|---|---|---|---|
| 4,932,023 | A * | 6/1990 | Geyer et al. | 370/456 |
| 5,852,406 | A * | 12/1998 | Edde et al. | 340/4.2 |
| 5,978,849 | A * | 11/1999 | Khanna | 709/227 |
| 6,094,485 | A * | 7/2000 | Weinstein | H04L 63/105 380/30 |
| 6,532,506 | B1 * | 3/2003 | Dunstan et al. | 710/100 |
| 6,721,331 | B1 * | 4/2004 | Agrawal et al. | 370/448 |
| 6,744,452 | B1 | 6/2004 | McBrearty et al. | |
| 6,851,062 | B2 | 2/2005 | Hartmann et al. | |
| 6,988,147 | B2 * | 1/2006 | King | 709/239 |
| 7,096,418 | B1 | 8/2006 | Singhal et al. | |
| 7,180,936 | B1 * | 2/2007 | Long | H04L 5/1438 370/201 |
| 7,231,530 | B1 * | 6/2007 | Miller et al. | 713/320 |
| 7,287,083 | B1 * | 10/2007 | Nay et al. | 709/229 |
| 7,340,414 | B2 * | 3/2008 | Roh et al. | 705/23 |

(Continued)

OTHER PUBLICATIONS

Chemmagate, "An Experimental Study of Web Transport Protocols in Cellular Networks", 2011.*
Rescorla et al., "Transport Layer Security (TLS) Renegotiation Indication Extension", RFC 5746, 2010.*
Belshe, "SSL FalseStart Performance Results", 2011.*
Kasper, "Fast Elliptic Curve Cryptography in OpenSSL", FC 2011 Workshops, 2012.*
Mavrogiannopoulose et al., "A Cross-Protocol Attack on the TLS Protocol", 2012.*
Stark et al., "The Case for Prefetching and Prevalidating TLS Server Certificates", 2012.*

(Continued)

*Primary Examiner* — O. C. Vostal
(74) *Attorney, Agent, or Firm* — Qudus Olaniran; Judy Yee; Micky Minhas

(57) ABSTRACT

Techniques described herein enable a client to store information indicating whether various hosts (e.g., servers, web domains) support a preferred security protocol, such as a False Start-modified TLS or SSL protocol. The client may then use this information to dynamically determine whether to use the preferred protocol when connecting to a particular host. When the client attempts a handshake to establish a secure connection with a host for the first time, the client does so using the preferred protocol. If the handshake fails, the client locally stores domain or other identifying information for the host so that the client may employ a non-preferred protocol in subsequent connection attempts. Thus, a client may avoid performance degradation caused by attempting a preferred-protocol connection with a host that does not support the preferred protocol. Stored information may include a time stamp enable periodic checks for host capability updates.

20 Claims, 6 Drawing Sheets

(56) References Cited

U.S. PATENT DOCUMENTS

| | | | |
|---|---|---|---|
| 7,430,633 B2 | 9/2008 | Church et al. | |
| 7,430,755 B1* | 9/2008 | Hughes | H04L 63/0823 726/3 |
| 7,434,255 B2* | 10/2008 | Akimoto | 726/13 |
| 7,502,726 B2* | 3/2009 | Panasyuk et al. | 703/22 |
| 7,555,561 B2 | 6/2009 | Michel | |
| 7,562,146 B2* | 7/2009 | Panasyuk et al. | 709/227 |
| 7,647,339 B2 | 1/2010 | Gonzalez | |
| 7,653,722 B1* | 1/2010 | Krishna et al. | 709/224 |
| 7,668,082 B1* | 2/2010 | Callon | 370/218 |
| 7,680,944 B1* | 3/2010 | Taghizadeh et al. | 709/230 |
| 7,730,523 B1* | 6/2010 | Masurkar | 726/4 |
| 8,095,787 B2* | 1/2012 | Kanekar | H04L 63/166 380/277 |
| 8,145,768 B1* | 3/2012 | Hawthorne | 709/228 |
| 8,175,272 B2* | 5/2012 | Braskich et al. | 380/258 |
| 8,218,478 B2* | 7/2012 | Lim et al. | 370/328 |
| 8,352,725 B1* | 1/2013 | O'Toole, Jr. | H04L 63/061 713/151 |
| 8,495,719 B2* | 7/2013 | Podjarny et al. | 726/8 |
| 8,520,646 B1* | 8/2013 | Dinan et al. | 370/338 |
| 8,646,041 B2* | 2/2014 | Urien | 713/150 |
| 2003/0018813 A1* | 1/2003 | Antes et al. | 709/245 |
| 2003/0159029 A1* | 8/2003 | Brown | G07B 17/00193 713/151 |
| 2004/0168055 A1* | 8/2004 | Lord | H04L 63/0823 713/156 |
| 2004/0202128 A1* | 10/2004 | Hovmark et al. | 370/331 |
| 2004/0205266 A1* | 10/2004 | Regal et al. | 710/29 |
| 2004/0249973 A1* | 12/2004 | Alkhatib et al. | 709/245 |
| 2005/0240940 A1 | 10/2005 | Quinet et al. | |
| 2006/0031680 A1 | 2/2006 | Maiman | |
| 2006/0109864 A1* | 5/2006 | Oksman | 370/474 |
| 2006/0179147 A1* | 8/2006 | Tran et al. | 709/227 |
| 2006/0209789 A1* | 9/2006 | Gupta et al. | 370/352 |
| 2007/0005779 A1 | 1/2007 | Yao et al. | |
| 2007/0058634 A1* | 3/2007 | Gupta et al. | 370/392 |
| 2007/0204089 A1* | 8/2007 | Proctor | G06F 11/1443 710/301 |
| 2007/0213600 A1* | 9/2007 | John et al. | 600/300 |
| 2007/0239886 A1* | 10/2007 | Montemayor et al. | 709/232 |
| 2007/0263874 A1* | 11/2007 | Harran | H04L 63/0428 380/277 |
| 2008/0046714 A1* | 2/2008 | Suganthi | H04L 63/0428 713/150 |
| 2008/0046727 A1* | 2/2008 | Kanekar et al. | 713/168 |
| 2008/0063204 A1* | 3/2008 | Braskich et al. | 380/270 |
| 2008/0065884 A1* | 3/2008 | Emeott et al. | 713/168 |
| 2008/0109650 A1* | 5/2008 | Shim et al. | 713/151 |
| 2008/0219240 A1* | 9/2008 | Dylag et al. | 370/352 |
| 2009/0083538 A1 | 3/2009 | Merugu et al. | |
| 2009/0125633 A1* | 5/2009 | Watsen et al. | 709/229 |
| 2009/0254745 A1* | 10/2009 | Ganesan | 713/151 |
| 2010/0005297 A1* | 1/2010 | Ganesan | 713/169 |
| 2010/0146415 A1 | 6/2010 | Lepeska | |
| 2010/0257588 A1* | 10/2010 | Urien | H04L 9/321 726/3 |
| 2010/0325418 A1* | 12/2010 | Kanekar | H04L 63/0823 713/151 |
| 2011/0082599 A1* | 4/2011 | Shinde et al. | 700/295 |
| 2011/0153807 A1 | 6/2011 | Vicisano et al. | |
| 2011/0162062 A1* | 6/2011 | Kumar et al. | 726/15 |
| 2011/0196809 A1* | 8/2011 | Salomon et al. | 705/36 R |
| 2011/0219442 A1* | 9/2011 | Brabson et al. | 726/10 |
| 2011/0307692 A1* | 12/2011 | Fritzges | H04L 63/0428 713/151 |
| 2011/0314275 A1* | 12/2011 | Gopshtein et al. | 713/165 |
| 2012/0042160 A1* | 2/2012 | Nakhjiri et al. | 713/151 |
| 2012/0075469 A1* | 3/2012 | Oskin et al. | 348/143 |
| 2012/0110319 A1* | 5/2012 | Swander | 713/150 |
| 2012/0117375 A1* | 5/2012 | Kanekar et al. | 713/151 |
| 2014/0289926 A1* | 10/2014 | Finzelberg | A62D 5/00 2/16 |

OTHER PUBLICATIONS

Gajek et al., "On the Insecurity of Microsoft's Identity Metasystem", 2008.*
Langley et al., "Transport Layer Security (TLS) False Start", 2010.*
Kasper, "Fast Elliptic Curve Cryptography in OpenSSL", 2012.*
Kuhlman et al., "A Proof of Security of a Mesh Security Architecture", 2007.*
Zaba, "Cryptographic Security in the Internet Protocol Suite: Practice and Proposals", 1997.*
Pullela, "Security Issues in Mobile Computing", 2002.*
Mavrogiannopoulos et al., "A Cross-Protocol Attack on the TLS Protocol", 2012.*
Kambourakis et al., "Performance Evaluation of Public Key-Based Authentication in Future Mobile Communication Systems", 2004.*
Koponen et al., "Resilient Connections for SSH and TLS", 2006.*
Dierks et al., "The Transport Layer Security (TLS) Protocol Version 1.2", RFC 5246, 2008.*
Fielding et al., "Hypertext Transfer Protocol—HTTP/1.1", RFC 2616, 1999.*
Brown et al., "Transport Layer Security (TLS) Authorization Extensions", RFC 5878, 2010.*
Dierks et al., "The TLS Protocol Version 1.0", RFC 2246, 1999.*
Dierks et al., "The Transport Layer Security (TLS) Protocol Version 1.1", RFC 4346, 2006.*
Salowey et al., "Transport Layer Security (TLS) Session Resumption without Server-Side State", RFC 5077, 2008.*
Shin et al., "A Study of the Performance of SSL on PDAs", 2009.*
Zhou et al., "Tunnel EAP Method (TEAP) Version 1", 2013.*
Cluts, "Control Your Cache, Speed up Your Site", Retrieved at << http://msdn.microsoft.com/en-us/library/bb250440(v=vs.85).aspx >>, Mar. 18, 1999, pp. 3.
Goodin, "Eureka! Google Breakthrough Makes SSL Less Painful", May 19, 2011, Available at: http://www.theregister.co.uk/2011/05/19/google_ssl_breakthrough//, 3 pgs.
Langley et al, "Transport Layer Security (TLS) False Start, draft-bmoeller-tls-falsestart-00", Jun. 2010, TLS Working Group, retrieved Jan. 31, 2012 from http://tools.ietf.org/html/draft-bmoeller-tls-falsestart-00, 12 pgs.
"Refreshing or Reloading Your Browser Window", Retrieved at << http://www.southboroughwebsitedesign.com/tips/refreshbrowser.htm >>, Retrieved Date : Feb. 24, 2012, pp. 3.
"Secure Communications using Secure Sockets Layer", Retrieved on: Dec. 26, 2011, Available at: http://publib.boulder.ibm.com/infocenter/wasinfo/v6r1/index.jsp?topic=%2Fcom.ibm.websphere.express.doc%2Finfo%2Fexp%2Fae%2Fcsec_sslsecurecom.html, IBM WebSphere Application Server, 6 pgs.
"Service Identity and Authentication", Retrieved on: Dec. 26, 2011, Available at: http://msdn.microsoft.com/en-us/library/ms733130.aspx, MSDN Library, 9 pgs.
Shacham et al., "Client Side Caching for TLS", Journal ACM Transactions on Information and System Security, Nov. 2004, vol. 7, Issue 4, 22 pgs.
Stark et al., "The Case for Prefetching and Prevalidating TLS Server Certificates", Retrieved on: Dec. 26, 2011, Available at: http://websec.sv.cmu.edu/prefetching/prefetching.pdf, to appear in proceedings of Network and Distributed System Security Symposium, Feb. 2012, 15 pgs.
"What is IE Save Buddy?", Retrieved at << http://www.doeasier.org/iesavebuddy/ >>, Retrieved Date : Feb. 24, 2012, pp. 3.
Extended European Search Report mailed Sep. 22, 2015 for European patent application No. 13754229.6, 9 pages.

* cited by examiner

First Visit 122

Second Visit 128

DYNAMIC SELECTION OF SECURITY PROTOCOL

BACKGROUND

Secure Sockets Layer (SSL) and Transport Layer Security (TLS) are communications protocols that operate at the application layer of the Open Systems Interconnection (OSI) model to provide secure communications between a client and a server over the Internet. In a simple SSL or TLS handshake, the client begins by sending a ClientHello that includes the protocol version supported by the client as well as a random number generated at the client. The server then responds with a ServerHello message that includes the protocol version supported by the server along with a random number generated at the server. The server may then send its certificate including its public key for encryption, and then sends a ServerHelloDone message indicating that it is done with handshake negotiation.

The client may then respond with a ClientKeyExchange message containing a PreMasterSecret encrypted using the server's public key. The client and server may then use the exchanged random numbers and PreMasterSecret to compute a common, MasterSecret used to generate session keys for the communications session. Then, the client and server send each other a ChangeCipherSpec indicating that subsequent messages will be encrypted, and an encrypted Finished message. The server and client will attempt to decrypt each other's Finished message. If either attempt fails, the handshake fails and the connection is terminated. If both client and server are successful in decrypting the Finished message, the handshake is successful. The handshake may be modified if the client also has its own certificate and/or if the handshake is resuming a previous session. However, in the simple case described above, the full handshake generally includes at least two full protocol round trips before the handshake is complete and the client and server can start sending application data, thus adding a latency penalty of two network round trip times to establish a communications session.

To reduce this latency, a proposal has been submitted to the TLS working group of the Internet Engineering Task Force (IETF) to modify TLS and possibly SSL by incorporating a feature called False Start. This proposed modification enables the client to begin sending application data before it has received and verified the server's Finished message. In the scenario where an abbreviated handshake is employed to resume a previous session, the server begins sending application data before it has received and verified the client's Finished message. Thus, False Start reduces the latency by one round trip time. However, if a False Start capable client attempts a False Start handshake with a server that does not support False Start, the handshake will fail and the client will attempt another handshake using the standard, non-False Start protocol, incurring a substantial latency penalty.

SUMMARY

Techniques described herein enable a client to store information indicating whether various servers or hosts support the False Start modification to TLS or SSL. The client may then use this information to determine whether to initiate a False Start handshake when connecting to a server. When a False Start capable client attempts a handshake to establish a secure connection with a server for the first time, the client does so using the False Start modified protocol. If the secure connection is established using False Start (e.g., if the handshake succeeds), then the client and server will proceed to exchange application data.

However if the handshake fails and the secure connection is not established, the client re-attempts to establish the connection using the standard (e.g., unmodified by False Start) TLS or SSL handshake, and information is stored on the client indicating that the server does not support False Start. The information stored may include an identification of the server and/or a web site hosted by the server, the identification being in the form of a domain, sub-domain, Uniform Resource Locator (URL), Internet Protocol (IP) address, and/or other identifying information. The information may be stored in the client's active memory (e.g., physical memory) to optimize establishing secure connections within a same communications session. The information may also be stored in persistent memory (e.g., on the client's hard drive) to optimize establishing secure connections across different communications sessions. In some cases (e.g., where the information is stored in persistent memory), the information may also include a time stamp indicating a time and date when the information was stored. Such a time stamp may enable a client to re-check a server or host to determine whether it has been updated to support False Start.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Embodiments described herein provide techniques for a False Start enabled client to determine whether to use a False Start modified protocol to attempt to establish a secure connection with a server or host. The False Start modification to SSL (e.g., SSL 3.0 and later) and TLS (e.g., TLS 1.0, 1.1, 1.2, and later) reduces latency by removing one round trip from the handshake that establishes the secure client-server connection. However, not all servers support protocols with the False Start modification. When a False Start supporting client attempts a handshake with a server that does not support False Start, the handshake fails and the client re-attempts a handshake without False Start. The first, abortive handshake attempt may cause increased latency in establishing a connection and may therefore degrade performance of a web browser or other client-side application attempting to establish the secure communications with the server. To prevent such performance degradation, embodiments enable the storage on the client of information or metadata indicating whether particular servers support False Start. The client may then use this data to determine whether to attempt a False Start handshake.

Figure 1A:
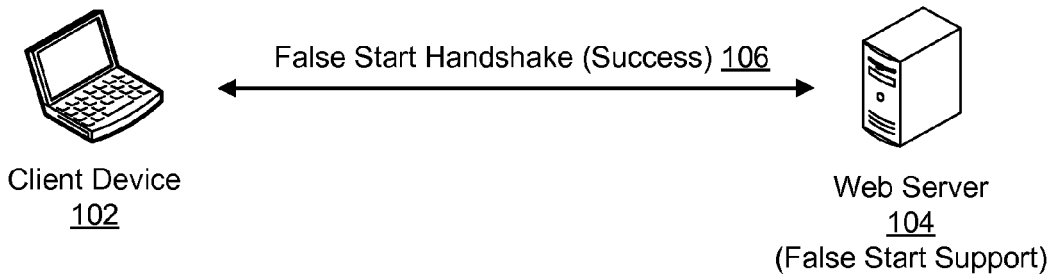
FIGS. 1A, 1B, and 1C illustrate example scenarios in which a False Start enabled client attempts a handshake with a server or host that is either False Start enabled or not False Start enabled.
Figure 1B:
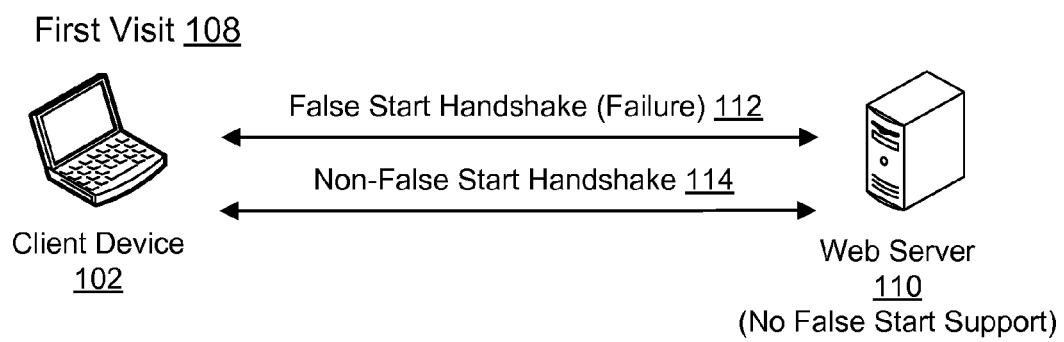
Figure 1B:
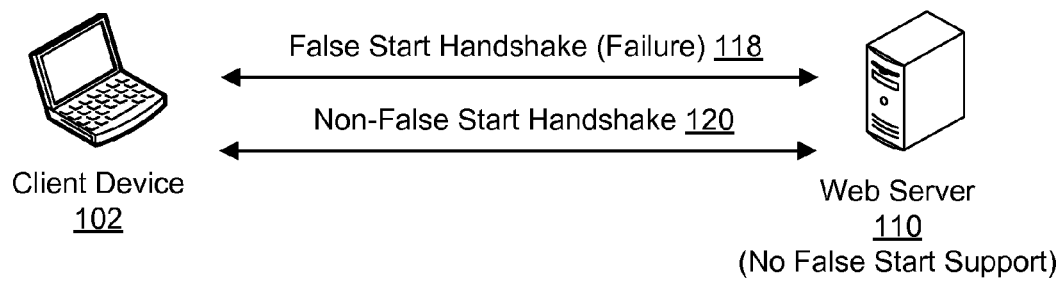
Figure 1C:
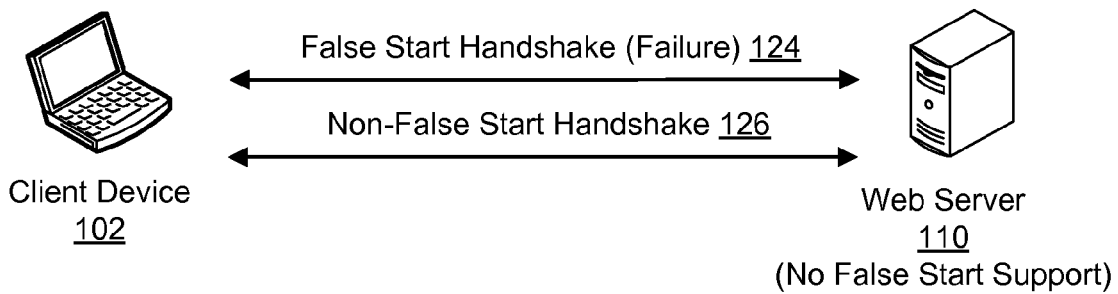
Figure 1C:
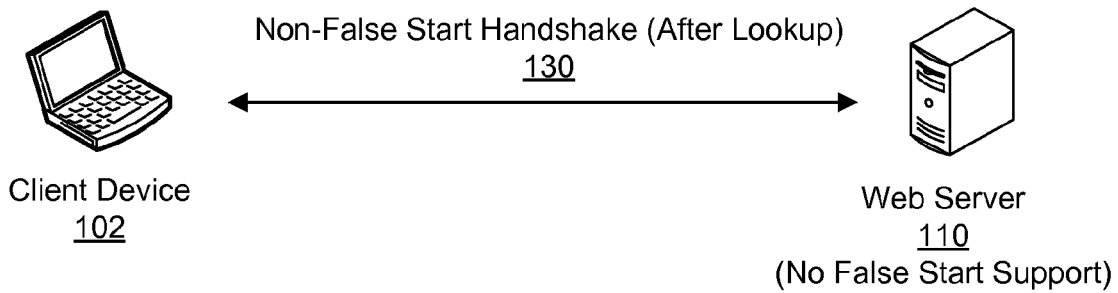

FIGS. 1A, 1B, and 1C illustrate example scenarios in which a False Start enabled client attempts a handshake with a server that is either False Start enabled or not False Start enabled. As shown in FIG. 1A, a client device 102 executing a False Start enabled client application attempts to connect to a web server 104 that supports False Start. In this case, the False Start Handshake 106 is successful. In some embodiments, the client application is Hypertext Transfer Protocol (HTTP) client that may execute on client device 102 as a component of a web browser or other application to connect to a web site or other web service provided by web server 104.

FIG. 1B illustrates an example scenario in which client device 102 attempts to connect to a different web server 110 that does not support False Start. On the client's First Visit 108 to web server 110, the client attempts a False Start Handshake 112 that fails due to the web server's lack of support for False Start. The client then re-attempts to connect using a Non-False Start Handshake 114. On a Second Visit 116, the client again attempts a False Start Handshake 118 that again fails, and the client then attempts to establish a connection using a Non-False Start Handshake 120. In this scenario, because the client does not incorporate the various features of embodiments described herein, the client has not learned from the failed False Start Handshake 112 of its First Visit 108, and re-attempts a False Start handshake on its Second Visit 116.

However, FIG. 1C illustrates an example scenario in which the client device 102 retains information that the web server 110 does not support False Start. On its First Visit 122, the client attempts a False Start Handshake 124 which fails because the web server 110 does not support False Start. The client then re-attempts to connect using Non-False Start Handshake 126. However, in this example after the first failed handshake the client stores information indicating that web server 110 does not support False Start. Consequently, on its Second Visit 128 the client looks up the information previously stored and, based on that information, knows not to attempt a False Start handshake with web server 110. Instead, the client attempts a Non-False Start Handshake 130. The storage, retrieval, and use of this information are described further below with regard to FIGS. 4 and 5.

Thus, by employing the stored information the client may determine whether to attempt a connection using a preferred security protocol (e.g., a False Start protocol), preventing a failed first attempt with a server that does not support the preferred security protocol. Because the client has access to information regarding the host server's capabilities (e.g., whether it supports False Start), the client may save up to three round-trip times: two round-trips for the initial abortive attempt at a False Start handshake, plus (in some cases) another round-trip time incurred because the TCP session may need to be reestablished after having been torn down by the server following an abortive attempt at a False Start handshake.

Moreover, because embodiments provide that the information regarding server capabilities is stored locally on the client itself, the client may dynamically determine which security protocol to employ without the need to access other information (e.g., a black-list of non-supporting hosts) stored on a remote server. This enables the client to make its determination more efficiently, without incurring the additional latency hit that may be required to retrieve server capability information from a remote server. Further, embodiments may also enable efficient communications because the server capability information is stored locally and is updated dynamically based on the client's ability to connect with certain hosts. Moreover, because the client itself stores information regarding server capabilities, the information may be updated more frequently than server capability information stored on a remote server (e.g., in a black list), thus leading to fewer failed handshakes using the preferred security protocol.

Illustrative Environment

Figure 2:
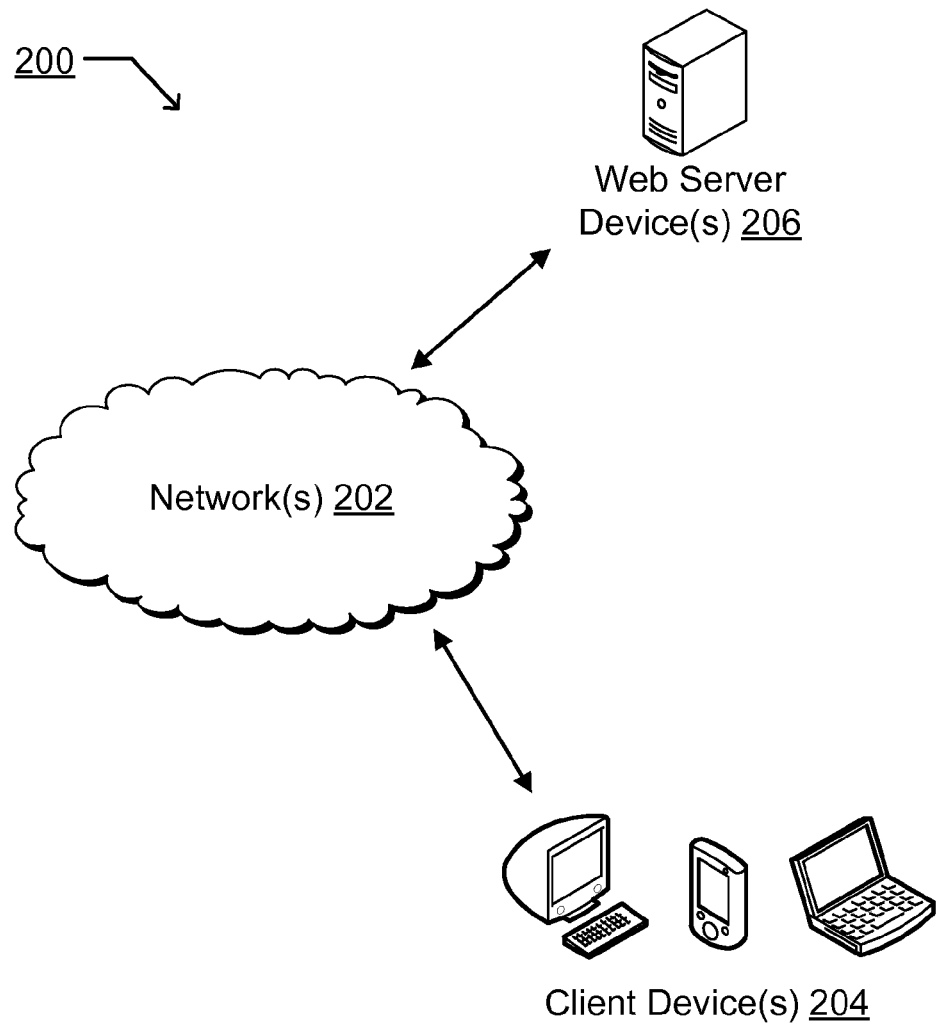
FIG. 2 is a diagram depicting an example environment in which embodiments may operate.

FIG. 2 shows an example environment 200 in which embodiments may operate. As shown, the various devices of environment 200 communicate with one another via one or more networks 202 that may include any type of networks that enable such communication. For example, networks 202 may include public networks such as the Internet, private networks such as an institutional and/or personal intranet, or some combination of private and public networks. Networks 202 may also include any type of wired and/or wireless network, including but not limited to local area networks (LANs), wide area networks (WANs), Wi-Fi, WiMax, and mobile communications networks (e.g. 3G, 4G, and so forth). Networks 202 may utilize communications protocols, including packet-based and/or datagram-based protocols such as internet protocol (IP), transmission control protocol (TCP), user datagram protocol (UDP), or other types of protocols. Moreover, networks 202 may also include a number of devices that facilitate network communications and/or form a hardware basis for the networks, such as switches, routers, gateways, access points, firewalls, base stations, repeaters, backbone devices, and the like.

Environment 200 further includes one or more client device(s) 204 associated with end user(s). Briefly described, client device(s) 204 may include any type of computing device that a user may employ to send and receive information over networks 202. For example, client device(s) 204 may include, but are not limited to, desktop computers, laptop computers, tablet computers, e-Book readers, wearable computers, media players, automotive computers, mobile computing devices, smart phones, personal data assistants (PDAs), game consoles, mobile gaming devices, set-top boxes, and the like.

Client device(s) 204 generally include one or more applications, including but not limited to word processing applications, games, web browsers, e-mail client applications, text messaging applications, chat or instant messaging (IM) clients, and other applications. One or more of these applications may include a component that enables the application to connect to a web site or otherwise access web-based information via HTTP or another networking protocol. Client device(s) 204, as well as the other device depicted in FIG. 2, and described further herein with regard to FIG. 3.

As further shown FIG. 2, environment 200 may include one or more web server device(s) 206 that are configured to serve content or provide services to users over network(s)

202. Such content and services may include, but are not limited to, hosted static and/or dynamic web pages, social network services, e-mail services, chat services, games, multimedia, and any other type of content, service or information provided over networks 202. Web server device(s) 206 may support one or more communication protocols for communicating with client device(s) 204 or other networked devices. For example, web server device(s) 206 may be configured to establish communications sessions using TCP/IP and/or respond to requests for data using HTTP. Web server device(s) 206 may further be configured to establish secure communications sessions using a security protocol such as TLS or SSL, which may be modified to support False Start.

Illustrative Computing System Architecture

Figure 3:
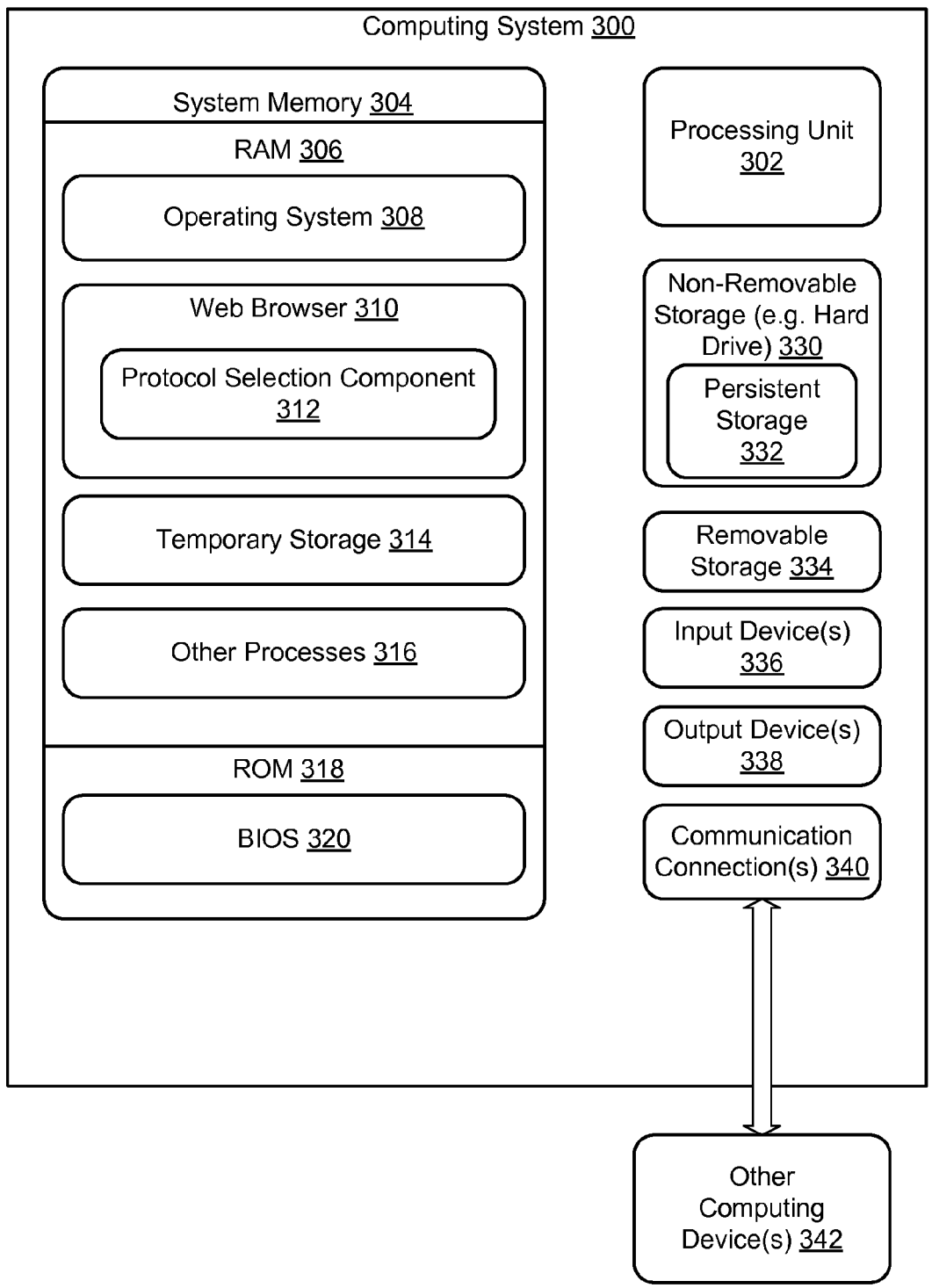
FIG. 3 is a diagram depicting an example computing system, in accordance with embodiments.

FIG. 3 depicts an example computing system 300 in which embodiments may operate. As shown, computing system 300 includes processing unit 302. Processing unit 302 may encompass multiple processing units, and may be implemented as hardware, software, or some combination thereof. Processing unit 302 may include one or more processors. As used herein, processor refers to a hardware component. Processing unit 302 may include computer-executable, processor-executable, and/or machine-executable instructions written in any suitable programming language to perform various functions described herein.

As shown in the example, computing system 300 further includes a system memory 304, which may include volatile memory such as random access memory (RAM) 306, static random access memory (SRAM), dynamic random access memory (DRAM), and the like. RAM 306 includes one or more executing operating systems (OS) 308, and one or more executing processes including components, programs, or applications that are loadable and executable by processing unit 302. Such processes may include web browser 310 which operates to communicate with web sites or other services available on the Internet. In some embodiments, web browser 310 includes a protocol selection component 312 that dynamically selects a particular communications protocol to use when communicating with a particular web server. As described further below, protocol selection component 312 may access stored information regarding a server to determine whether to employ a False Start enabled TLS or SSL protocol to establish a secure connection with a server. In some embodiments, RAM 306 may include physical memory (e.g., temporary storage 314) in which an OS 308, web browser 310, and/or other processes 316 execute.

System memory 304 may further include non-volatile memory such as read only memory (ROM) 318, flash memory, and the like. As shown, ROM 318 may include a Basic Input/Output System (BIOS) 320 used to boot computing system 300. Though not shown, system memory 304 may further store program or component data that is generated and/or employed by OS 308, web browser 310, and/or other processes 316 during their execution. System memory 304 may also include cache memory.

As shown in FIG. 3, computing system 300 may also include non-removable storage 330 (e.g., a hard drive) and/or removable storage 334, including but not limited to magnetic disk storage, optical disk storage, tape storage, and the like. Disk drives and associated computer-readable media may provide non-volatile storage of computer readable instructions, data structures, program modules, and other data for operation of computing system 300. Moreover, non-removable storage 330 may further include persistent storage 332.

In general, computer-readable media includes computer storage media and communications media.

Computer storage media is tangible media that includes volatile and non-volatile, removable and non-removable media implemented in any method or technology for storage of information such as computer readable instructions, data structure, program modules, and other data. Computer storage media includes, but is not limited to, RAM, ROM, erasable programmable read-only memory (EEPROM), SRAM, DRAM, flash memory or other memory technology, compact disc read-only memory (CD-ROM), digital versatile disks (DVDs) or other optical storage, magnetic cassettes, magnetic tape, magnetic disk storage or other magnetic storage devices, or any other non-transmission medium that can be used to store information for access by a computing device.

In contrast, communication media is non-tangible and may embody computer readable instructions, data structures, program modules, or other data in a modulated data signal, such as a carrier wave or other transmission mechanism. As defined herein, computer storage media does not include communication media.

Computing system 300 may include input device(s) 336, including but not limited to a keyboard, a mouse, a pen, a game controller, a voice input device for speech recognition, a touch input device, and the like. Computing system 300 may further include output device(s) 338 including but not limited to a display, a printer, audio speakers, a haptic output, and the like. Computing system 300 may further include communications connection(s) 340 that allow computing system 300 to communicate with other computing devices 342 including client devices, server devices, databases, and/or other networked devices available over one or more communication networks.

Illustrative Processes

Figure 4:
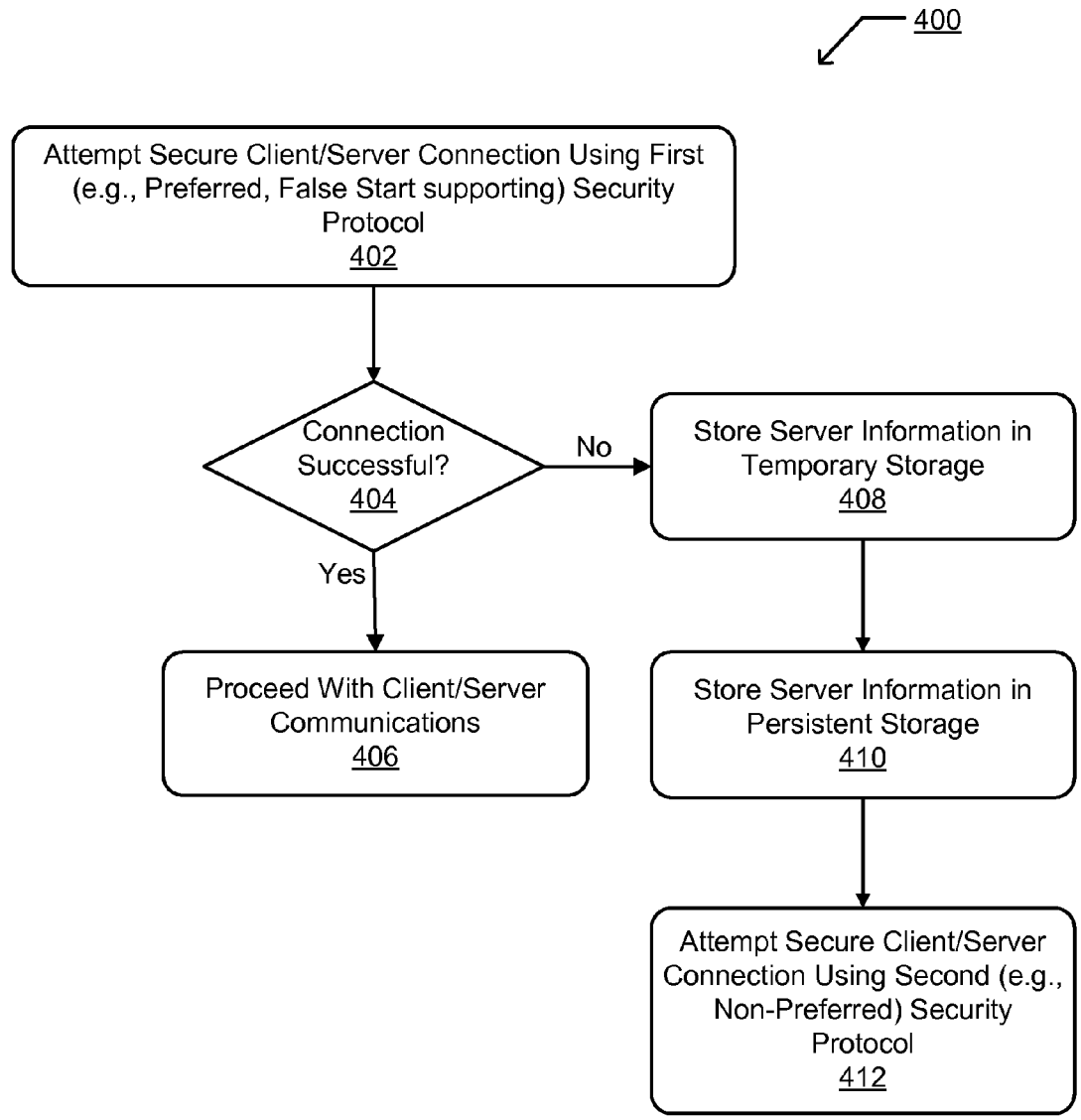
FIG. 4 depicts a flow diagram of an illustrative process for storing information on a client to indicate whether a server supports a preferred security protocol (e.g., a protocol that supports False Start).
Figure 5:
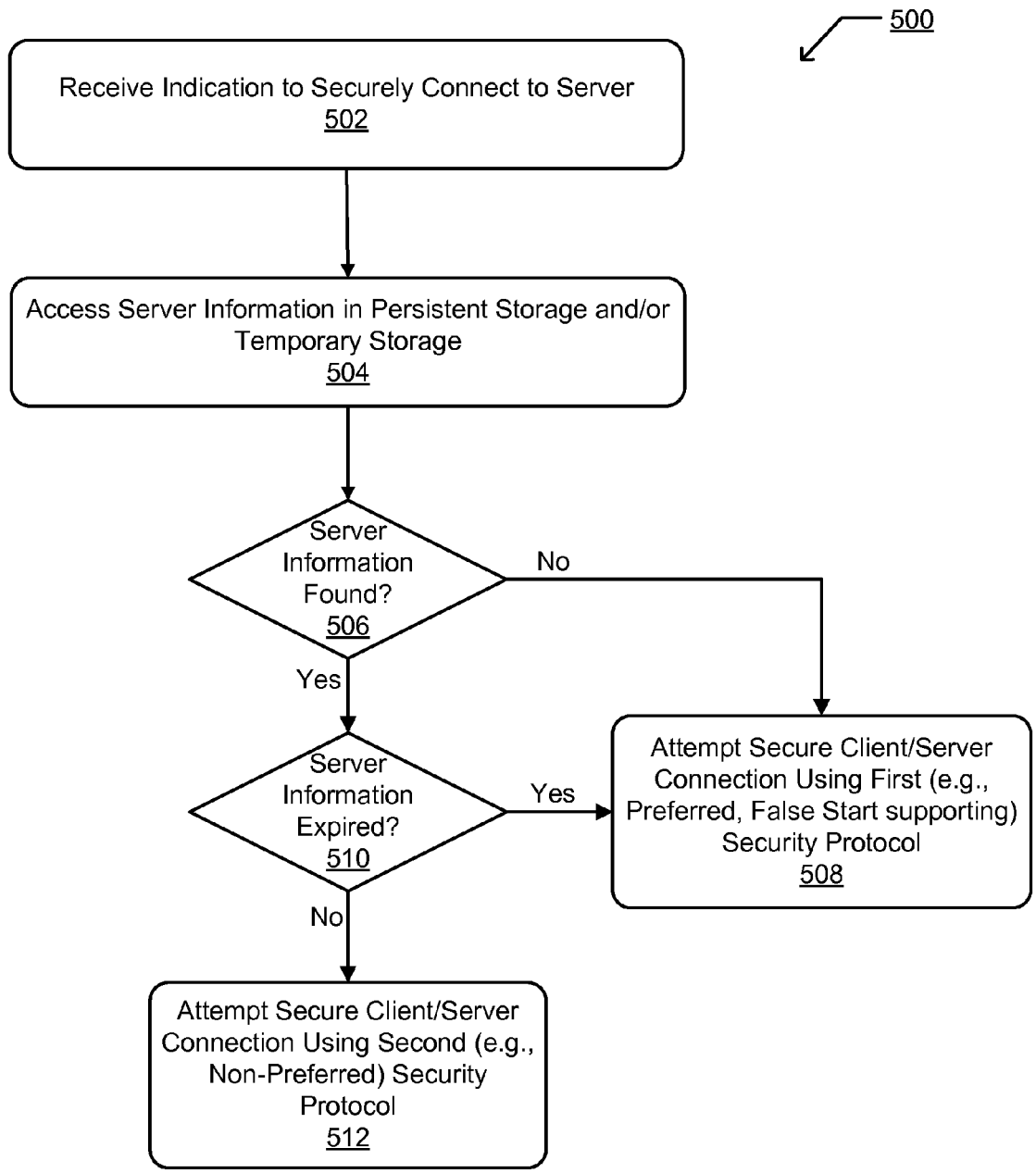
FIG. 5 depicts a flow diagram of an illustrative process for employing stored information on a client to determine whether to attempt a connection using a preferred security protocol (e.g., a protocol that supports False Start).

FIGS. 4 and 5 depict flowcharts showing example processes in accordance with various embodiments. The operations of these processes are illustrated in individual blocks and summarized with reference to those blocks. The processes are illustrated as logical flow graphs, each operation of which may represent one or more operations that can be implemented in hardware, software, or a combination thereof. In the context of software, the operations represent computer-executable instructions stored on one or more computer storage media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations may be combined in any order, subdivided into multiple sub-operations, and/or executed in parallel to implement the described processes.

FIG. 4 depicts an example process 400 for storing information on a client to indicate whether a server or host supports a preferred security protocol (e.g., a secure communications protocol that supports False Start). In some embodiments, process 400 is performed by a component such as protocol selection component 312 executing on a client device. Moreover, process 400 may be performed by a client process such as a HTTP client that is part of a browser or other application executing on client device.

At 402 an attempt is made to establish a secure connection between the client and a server (e.g., a web server) using a first security protocol. In some embodiments, the first security protocol is a preferred security protocol such as a SSL or TLS protocol that supports False Start to reduce latency as described above, and the client attempts a SSL or TLS handshake modified by False Start. At block 404 a determination is made whether the handshake was successful and the connection was established. For example, as described above when using the False Start modified protocol, the client may begin sending application data prior to receiving the server's Finished message (or other communication indication that the TLS or SSL handshake is complete). If the server does not support False Start, the server may interpret the client transmission of application data as premature and abort or otherwise tear down the connection to the client. In such situations, the server may send a communication to the client to indicate a failure, including but not limited to a SSL or TLS alert, a SSL or TLS error message, and/or a TCP message (e.g., TCP FIN or TCP RESET). Moreover, in some embodiments the client may timeout after not receiving any response from the server after a certain period of time. Various embodiments may use one or more these events to determine at block 404 that the server does not support False Start. Although there may be other reasons that the connection failed, embodiments may infer that the server does not support False Start based on the failure to establish the secure connection or session.

If the connection was successfully established, then the client and server may proceed with communications to exchange application data at 406. However if the connection was not successfully established, information regarding the server may be stored in temporary storage on the client (e.g., temporary storage 314) at 408. In some embodiments, the information is stored in a database, list, or other data structure and the information stored identifies those servers that the client has determined do not support the first security protocol. Such identification information may include domain information for the servers at any domain level or sub-domain level, a URL for each server, or other identifying information (e.g., an IP address).

In some embodiments, the temporary storage may be an in-memory data structure in the process's active memory (e.g., physical memory or virtual memory) in which a protocol selection component is executing process 400. In some embodiments, this information in temporary storage may be available for as long as the process is active, the particular connections are active, and/or for a certain predetermined period of time (e.g., ten minutes) after the connections become inactive. In this way, storing the information in temporary storage may enable optimization of multiple connections to a server with a same session, so that the HTTP client or other component may efficiently retrieve the stored information regarding server capabilities from physical memory instead of having to access a hard drive or other persistent storage. Thus, a user returning to a same host or web site after a period of time may be able to connect more quickly, given that the client can efficiently retrieve the host capability information from temporary storage.

At 410 the information regarding server capabilities may additionally be stored in persistent storage, such as persistent storage 332 on a hard drive or other non-removable storage of a client device. Saving server capability information in persistent storage may enable optimization of connections to a server across multiple sessions. For example, after a particular session is terminated and the temporary storage is released, server capability information may be retrieved from persistent storage during a subsequent session. Thus, a client may be able to determine whether a particular server supports a preferred security protocol (e.g., with False Start) based on server capability information gathered during a previous session.

In some embodiments, the server information stored in persistent storage includes the same or similar server identification (e.g., domain) information to that stored in temporary storage. In some embodiments, the server information stored in persistent storage may also include for each server a time stamp indicating a time and date when the information was stored. This time stamp may provide a heuristic to enable the client at a later time to re-attempt a connection to a server using the first security protocol, and thus periodically check to determine whether the server's capabilities have updated or expanded to support the first security protocol (e.g., a protocol that includes False Start). This aspect is further described with regard to FIG. 5.

At 412 an attempt is made to establish a secure client/server connection using a second security protocol. In some embodiments, the second security protocol is a non-preferred or less preferred protocol, such as a SSL or TLS protocol that does not support False Start. In some embodiments, the server information is stored in temporary and/or persistent storage prior to this second handshake attempt and following the first, failed handshake attempt. In some embodiments, the server information may be stored following the second handshake attempt. Moreover, in some embodiments at 412 a TCP session may need to be reestablished because the server may have torn down the existing session when the False Start handshake failed.

FIG. 5 depicts an example process 500 for employing stored information on a client to determine whether to attempt a connection using a preferred security protocol (e.g., a protocol that supports False Start). In some embodiments, process 500 is performed by a component such as protocol selection component 312 executing on a client device. Moreover, process 500 may be performed by a client process such as a HTTP client that is part of a browser or other application executing on client device.

At 502 an indication is received to securely connect with a server. For example, such an indication may be triggered when a user wishes to connect to a web site on a server through a web browser or other application on the client, using a secure communications protocol such as SSL or TLS. At 504 server information is accessed, either from the persistent storage or from the process's in-memory, temporary storage where it was previously stored as described above. In some embodiments, the in-memory temporary storage is checked first, and the persistent storage is checked subsequently if the information is not found in temporary storage.

At 506 a determination is made whether information for the server is found in the accessed information. In some embodiments, the information is stored as a database, list, or other data structure on the client, and the presence of a domain of the server in the database indicates that the server does not support the first security protocol (e.g., the preferred protocol that supports False Start). If the server's domain is not listed in the database, or the database otherwise indicates that the server supports the first security protocol, then process 500 proceeds to 508 and the client attempts to establish a secure connection to the server using the first security protocol as described above with regard to FIG. 4.

If at 506 the server's domain is listed in the database, or the database otherwise indicates that the server does not support the first security protocol, a time stamp associated with the server's domain may be checked to determine whether the information identifying that server is out of date (e.g., has expired). In some embodiments, this check may include comparing the date/time of the time stamp to a current date/time, and determining a difference between the two (e.g., an elapsed time since the information was stored). If the time difference is not greater than a predetermined threshold (e.g., 30 days), a determination may be made that the server information has not expired, and at 512 an attempt may be made to establish a secure connection using the second security protocol (e.g., the non-preferred protocol that does not support False Start).

However, if the time difference is greater than a predetermined threshold, a determination may be made that the server's information has expired or is otherwise out of date. In that case, a connection attempt may be made using the first protocol at 508. In this way, the time stamp stored with the server domain may provide a means for checking whether the server has been updated to support the first protocol (e.g., False Start) since the time when the information was stored. In some embodiments, the threshold may be configurable to provide a more or less frequent check of non-False Start capable servers to determine whether their capabilities have been upgraded.

Some embodiments support an additional support process that executes periodically on the client to check whether host capability information is up-to-date. For example, such a process may analyze the stored list of hosts and for every host whose information is out of date (e.g., older than a predetermined period of time) remove that host from the list to save space in persistent memory. Moreover, in some embodiments such a process may, for each host whose information in the list is out of date, attempt a TLS False Start or SSL False Start connection with the host and either remove the host from the list (e.g., if the connection is successful) or leave the host in the list and update the time stamp to the current date/time (e.g., if the connection is unsuccessful).

Further, some embodiments support an optimization for consolidation of the host list, in which high-level domain information is stored in preference to lower-level domains (e.g., storing abcdefg.com instead of www.abcdef.com, mail.abcdef.com, and so forth). Moreover, in some embodiments lower-level domain information may be stored in the database until a time when the list includes a certain threshold number of lower-level domains that share a high-level domain (e.g., www.abcdef.com, mail.abcdef.com, news.abcdef.com, and so forth). At that point, those lower-level domains may be replaced in the list with a high-level domain (e.g., abcdef.com) to save space in the list. In some embodiments, the support process discussed above may perform this consolidation process. However, in some embodiments, a separate process may operate to perform the consolidation.

CONCLUSION

Although the techniques have been described in language specific to structural features and/or methodological acts, it is to be understood that the appended claims are not necessarily limited to the specific features or acts described. Rather, the specific features and acts are disclosed as example implementations of such techniques.

What is claimed is:

1. A computer-implemented method comprising:
   determining that a secure connection was not successfully established between a client and a server using a first security protocol, wherein the first security protocol includes an abbreviated handshake;
   at least in part based on determining that the secure connection was not successfully established using the first security protocol, storing to memory on the client information identifying the server as a server that does not support the first security protocol; and
   at least in part based on determining that the secure connection was not successfully established using the first security protocol, attempting to establish the secure connection between the client and the server using a second security protocol that includes an unabbreviated handshake.

2. The method of claim 1, wherein the first security protocol is a Secure Sockets Layer (SSL) that supports False Start or a Transport Layer Security (TLS) protocol that supports False Start, and wherein the second security protocol is a SSL that does not support False Start or a TLS protocol that does not support False Start.

3. The method of claim 1, wherein the information is stored in temporary storage on the client.

4. The method of claim 1, wherein the information is stored in persistent storage on the client.

5. The method of claim 1, wherein the information is stored on the client in a database that identifies one or more domains that do not support the first security protocol.

6. The method of claim 5, wherein the information further includes, for each of the one or more domains, a time stamp indicating a date and a time when the information of the respective domain was stored in the database.

7. The method of claim 1, further comprising:
   during an attempt to establish a subsequent secure connection between the client and the server, accessing the information stored on the client;
   determining that the server does not support the first security protocol based at least partly on the information; and
   based on determining that the server does not support the first security protocol, attempting to establish the subsequent secure connection using the second security protocol without attempting to establish the subsequent secure connection using the first security protocol.

8. The method of claim 1, further comprising:
   during an attempt to establish a subsequent secure connection between the client and the server, accessing the information stored on the client;
   determining that the information stored on the client includes expired information for the server; and
   attempting to establish the subsequent secure connection using the first security protocol.

9. One or more computer storage media storing instructions that, when executed by at least one processor, instruct the processor to perform actions comprising:
   receiving an indication that a secure connection is to be established between a client and a server;
   accessing information in storage on the client device, in advance of attempting to establish the secure connection, the information identifying the server as a server that does not support a preferred security protocol, wherein the preferred security protocol includes an abbreviated handshake; and
   at least in part in response to accessing the information identifying the server as the server that does not support the preferred security protocol, establishing the secure connection using a non-preferred security protocol that includes an unabbreviated handshake and wherein the unabbreviated handshake employs a greater number of round trip communications than the abbreviated handshake to establish a communications session.

10. The one or more computer storage media of claim 9, wherein the preferred security protocol is a Secure Sockets Layer (SSL) that supports False Start or a Transport Layer Security (TLS) protocol that supports False Start, and wherein the non-preferred security protocol is a SSL that does not support False Start or a TLS protocol that does not support False Start.

11. The one or more computer storage media of claim 9, wherein the actions further comprise determining that the information identifying the server as the server that does not support the preferred security protocol is expired based on a time stamp stored with the information identifying the server as the server that does not support the preferred security protocol and indicating a date and a time when the information identifying the server as the server that does not support the preferred security protocol was stored in the database.

12. The one or more computer storage media of claim 9, wherein the information identifying the server as the server that does not support the preferred security protocol is in temporary storage on the client to establish secure connections within a same communications session.

13. The one or more computer storage media of claim 9, wherein the information identifying the server as the server that does not support the preferred security protocol is in persistent storage on the client to establish secure connections across different communications sessions.

14. The one or more computer storage media of claim 9, wherein the information identifying the server as the server that does not support the preferred security protocol includes a domain of the server.

15. The one or more computer storage media of claim 9, wherein the preferred security protocol enables the client to begin sending application data to the server before the client has received a Finished message from the server, and the non-preferred protocol does not enable the client to begin sending application data to the server before the client has received the Finished message from the server.

16. A client device comprising:
at least one processor; and
memory storing computer-readable instructions executable by the at least one processor to perform operations including:
  attempting to establish a secure connection between the client device and a server using a first security protocol that supports False Start;
  determining whether the secure connection was successfully established using the first security protocol;
  based on a determination that the secure connection was not successfully established using the first security protocol, storing information on the client device identifying the server as not supporting False Start; and
  re-attempting to establish the secure connection between the client device and the server using a second security protocol that does not support False Start.

17. The client device of claim 16, wherein the information identifying the server as not supporting False Start is stored on a database in the memory of the client device.

18. The client device of claim 16, further comprising a hard drive, wherein the information identifying the server as not supporting False Start is stored in persistent storage on the hard drive.

19. The client device of claim 16, wherein at least a portion of the computer-readable instructions stored in the memory comprise a web browser application.

20. The client device of claim 16, wherein the operations further include:
  subsequently receiving an indication that a subsequent secure connection is to be established between the client device and the server;
  accessing the stored information to determine whether the server does not support False Start;
  based on a determination that the stored information indicates that the server does not support False Start and that the stored information is not expired, attempting to establish the subsequent secure connection using the second security protocol that does not support False Start.

* * * * *